United States Patent
Drumm

(10) Patent No.: US 8,342,615 B2
(45) Date of Patent: Jan. 1, 2013

(54) BRAKING SYSTEM FOR MOTOR VEHICLES

(75) Inventor: Stefan Drumm, Saulheim (DE)

(73) Assignee: Continental Teves AG & Co. oHG (DE)

( * ) Notice: Subject to any disclaimer, the term of this patent is extended or adjusted under 35 U.S.C. 154(b) by 878 days.

(21) Appl. No.: 12/377,620

(22) PCT Filed: Aug. 29, 2007

(86) PCT No.: PCT/EP2007/058989
§ 371 (c)(1),
(2), (4) Date: Feb. 16, 2009

(87) PCT Pub. No.: WO2008/025797
PCT Pub. Date: Mar. 6, 2008

(65) Prior Publication Data
US 2010/0225159 A1      Sep. 9, 2010

(30) Foreign Application Priority Data

Aug. 29, 2006  (DE) .......................... 10 2006 040 424

(51) Int. Cl.
*B60T 13/128* (2006.01)
(52) U.S. Cl. ............. 303/20; 303/3; 303/15; 303/113.3; 303/114.1; 303/115.1; 303/116.1; 303/155; 303/158; 60/548; 60/562; 60/563; 60/566; 188/72.4; 188/152; 188/158; 188/345; 188/358; 188/359
(58) Field of Classification Search .................... 303/20, 303/116.1, 155, 115.1, 119.1, 119.3, DIG. 10, 303/116.4; 701/70, 29, 45; *B60T 008/17*
See application file for complete search history.

(56) References Cited

U.S. PATENT DOCUMENTS

| | | | | |
|---|---|---|---|---|
| 3,310,944 | A * | 3/1967 | Bauman | 60/562 |
| 5,031,968 | A * | 7/1991 | Takata | 303/15 |
| 6,227,626 | B1 | 5/2001 | Blattert | |
| 6,957,871 | B2 * | 10/2005 | Maki | 303/114.1 |
| 2003/0214180 | A1 * | 11/2003 | Kusano | 303/116.2 |
| 2004/0020201 | A1 * | 2/2004 | Feigel et al. | 60/534 |
| 2004/0189087 | A1 * | 9/2004 | Kusano | 303/114.1 |
| 2004/0239175 | A1 * | 12/2004 | Beccafico et al. | 303/113.1 |
| 2005/0225168 | A1 | 10/2005 | Nakamura et al. | |
| 2005/0236892 | A1 * | 10/2005 | Kusano | 303/116.1 |
| 2006/0186733 | A1 | 8/2006 | Drumm | |

(Continued)

FOREIGN PATENT DOCUMENTS

DE      197 32 229 A1      3/1998

(Continued)

*Primary Examiner* — Robert A Siconolfi
*Assistant Examiner* — San Aung
(74) *Attorney, Agent, or Firm* — RatnerPrestia

(57) ABSTRACT

A braking system having a master cylinder to which wheel brake circuits (I, II) can be connected, a first piston coupled to a brake pedal, a second piston by means of which the master cylinder is actuated, a third piston actuated by the first piston and connected in a force transmitting fashion to the second piston, a simulation device which gives the driver of the vehicle a pedal sensation, an intermediate space between the second piston and third piston, a pressure generating device which controls the pressure in the intermediate space, a pressure medium reservoir vessel which is under atmospheric pressure and which can be connected hydraulically to the intermediate space, and means for electrically controlling the pressure in the intermediate space.

18 Claims, 2 Drawing Sheets

U.S. PATENT DOCUMENTS

| | | | |
|---|---|---|---|
| 2008/0135357 A1* | 6/2008 | Lang | 188/158 |
| 2008/0258545 A1 | 10/2008 | Drumm | |

FOREIGN PATENT DOCUMENTS

| | | |
|---|---|---|
| DE | 197 03 776 A1 | 8/1998 |
| DE | 103 21 721 A1 | 12/2003 |
| DE | 103 30 146 A1 | 1/2005 |
| DE | 103 46 674 A1 | 1/2005 |
| DE | 10 2004 025 638 A1 | 9/2005 |
| EP | 1 078 833 A2 | 2/2001 |
| WO | WO 2006/042822 | 4/2006 |

* cited by examiner

BRAKING SYSTEM FOR MOTOR VEHICLES

CROSS REFERENCE TO RELATED APPLICATIONS

This application is the U.S. National Phase Application of PCT International Application No. PCT/EP2007/058989, filed Aug. 29, 2007, which claims priority to German Patent Application No. DE 10 2006 040 424.6, filed Aug. 29, 2006, the contents of such applications being incorporated by reference herein.

BACKGROUND OF THE INVENTION

1. Field of the Invention

The invention relates to a braking system for motor vehicles having
- a master cylinder to which wheel brake circuits are connected,
- a first piston which is coupled to a brake pedal via a pressure rod which transmits actuating forces,
- a second piston by means of which the master cylinder is actuated,
- a third piston which can be actuated by the first piston and which can be connected in a force transmitting fashion to the second piston,
- having a simulation device with at least one elastic element which gives the driver a pleasant pedal sensation,
- having an intermediate space, to which hydraulic pressure can be applied, between the second piston and third piston, wherein application of pressure to the intermediate space loads the second and third pistons in opposite directions,
- having a hydraulic chamber which is bounded by the third piston, can be disconnected by means of a check valve and with which, when necessary, a movement of the third piston in the actuating direction is prevented,
- having a pressure generating device which controls the pressure in the intermediate space,
- having a pressure medium reservoir vessel which is under atmospheric pressure and which can be connected hydraulically to the intermediate space,
- and having means for electrically controlling the pressure applied to the intermediate space.

2. Description of the Related Art

Brake-by-wire braking systems are becoming increasingly widespread in motor vehicle engineering. In these braking systems, the brake can, on the one hand, be actuated "externally" without active intervention by the driver of the vehicle on the basis of electronic signals. These electronic signals can be output, for example, by an electronic stability program ESP or a distance control system ACC. Otherwise, it is possible to dispense entirely or partially with actuation of the braking system if a braking effect which is requested by the driver of a vehicle by actuation of a brake pedal is brought about, for example, by switching over an electric vehicle drive into a generator mode. In both cases, the actuating state of the brake does not correspond to the actuation of the brake pedal which is predefined by the driver of the vehicle. In conventional braking systems, this leads to a reaction on the brake pedal. The brake pedal characteristic, i.e. the dependence of the brake pedal travel on the brake pedal force, is disrupted by the described reaction. This reaction effect on the brake pedal can be surprising and unpleasant for the driver, with the result that in a critical situation of road traffic the driver does not actuate the brake pedal to a degree which is adapted to this situation since he is irritated by the reaction on the brake pedal which he cannot predict.

A braking system of the generic type mentioned at the beginning is known from DE 10 321 721 A1. The braking system which is disclosed in the aforesaid publication can be used, inter alia, in vehicles with a hybrid drive in which what are referred to as regenerative braking processes are carried out. The pressure control valve which serves to control the pressure applied to the abovementioned intermediate space is driven using mechanical force transmitting means in the previously mentioned braking system, which means are arranged effectively between the first piston and the valve body of the pressure control valve. Electromagnetically drivable valve devices, which are embodied as (currentless closed) 2/2 way valves which can be controlled in an analog fashion and closed in the currentless state, are provided as means for electrically controlling the pressure applied to the intermediate space. It is considered disadvantageous with the previously known braking system that the actuating energy which is necessary to operate it has to be kept available in a high pressure accumulator whose pressure medium flows into the wheel brake circuits during actuation of the brakes. On the one hand, it is energetically inefficient firstly to raise the pressure medium to the high pressure level of the high pressure accumulator even though only a fraction of this accumulator pressure level is required for the majority of braking operations, and on the other hand this entails the risk that in the event of possible contamination of the pressure medium by gas bubbles, the braking system can fail as a result of the fact that the volume expansion of the gas bubbles which is associated with the flow out of the high pressure accumulator said gas bubbles can expel from the braking lines a column of liquid which is necessary for the hydraulic transmission of force.

SUMMARY OF THE INVENTION

An object of the present invention is therefore to propose a braking system of the generic type mentioned at the beginning in which it is possible to dispense with complex, energetically unfavorable buffering of hydraulic actuating energy, which promotes failure of the braking system.

This object is achieved according to aspects of the invention in that the pressure medium which is required to electrically control the pressure applied to the intermediate space is kept available under atmospheric pressure, and if necessary placed under a higher pressure in the pressure generating device.

In order to give more specific detail on the inventive concept there is provision that the pressure generating device is formed by a cylinder/piston arrangement whose piston can be actuated by an electromechanical actuator.

In one advantageous development of the subject matter of the invention, an electrical energy store is provided which supplies the electromechanical actuator with energy.

Another advantageous development of the invention consists in the fact that the simulation device is assigned to a first brake booster pressure medium circuit, and the pressure generating device is assigned to a second brake booster pressure medium circuit, wherein, while the braking system is operating, no exchange of pressure medium takes place between the first and second brake booster pressure medium circuits and the wheel brake circuits. As a result of these measures, the operational reliability of the braking system according to aspects of the invention is considerably increased since a possible leakage in one of the hydraulic circuits does not affect the other hydraulic circuits.

In another refinement of the subject matter of the invention, the pressure generating device is connected to a chamber of the second pressure medium reservoir vessel which is at atmospheric pressure, with the intermediate connection of an electrically switchable 2/2 way valve. Of course, it is also possible for the keeping available of the pressure medium supply at the atmospheric pressure level to be effected, as is customary in brake technology, by means of a snifting bore, a tilting valve or a central valve. The electrically switchable 2/2 way valve provides, however, the advantage that the actuator of the pressure generating device can, if necessary, start to increase the pressure immediately, and not only after a valve switching travel has been executed.

The present invention is explained below in more detail on the basis of two exemplary embodiments and with reference to the appended schematic drawing, in which the same components are provided with the same reference symbols.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
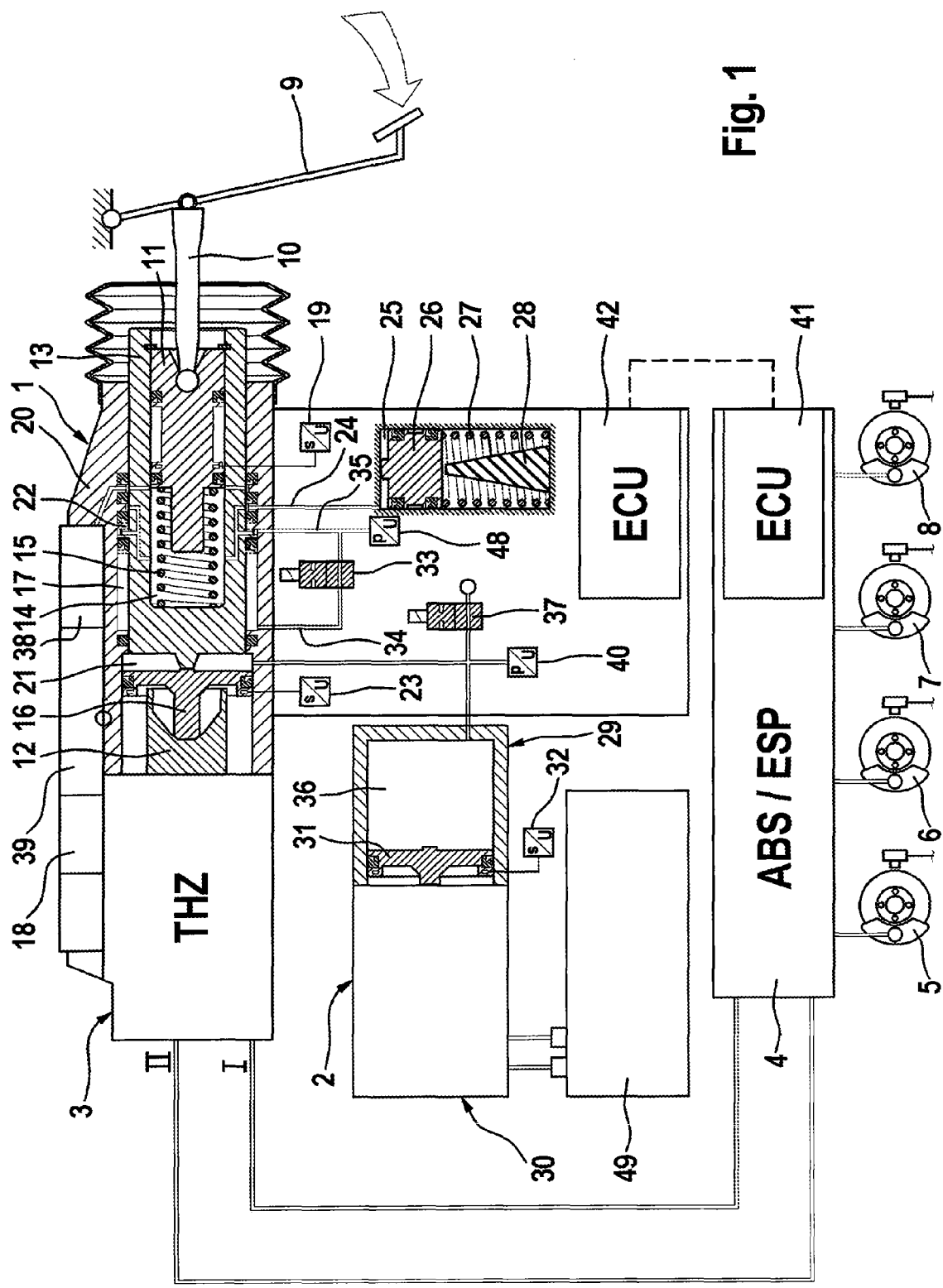
FIG. 1 shows the design of a first embodiment of the braking system according to aspects of the invention.

The braking system according to aspects of the invention which is illustrated in the drawing is composed essentially of an actuating device 1, a pressure generating device 2—with the actuating unit and the pressure generating device forming a brake booster—and a master brake cylinder or tandem master cylinder 3 which is effectively connected downstream of the brake booster and whose pressure spaces (not illustrated) can be connected to the chambers of a first pressure medium reservoir 18 which are at atmospheric pressure. On the other hand, wheel brake circuits I, II, which, with intermediate connection of a known ABS or ESP hydraulic assembly or of a controllable wheel brake pressure modulation module, supply the wheel brakes 5-8 of a motor vehicle with hydraulic pressure medium, are connected to the pressure spaces. An electronic open-loop and closed-loop control unit 41 is assigned to the wheel brake pressure modulation module 4. The actuating device 1, which is arranged in a housing 20, to which the tandem master cylinder 3 is connected, can be driven by means of a brake pedal 9 which is effectively connected via an actuating rod 10 to a first piston 11 of the actuating device 1. The actuating path of the brake pedal 9 is sensed by means of a travel sensor 19 which senses the travel of the first piston 11. However, a rotary angle sensor, which senses the rotary angle of the brake pedal 9, can be used for the same purpose. The first piston 11 is arranged in a third piston 13 in which it bounds a pressure chamber 14 which accommodates a pressure spring 15 which, when the brake pedal 9 is not actuated, causes the first piston 11 to bear against the third piston 13. Alternatively or additionally, a pedal restoring spring can be provided in the region of the pressure rod 10 or of the brake pedal 9. The pressure chamber 14 is connected in the nonactuated state of the actuating device 1 to a chamber 38 of a second pressure medium reservoir vessel 38, 39 which is assigned to the actuating device 1. The third piston 13 interacts with a second piston 12 which can form the primary piston of the tandem master cylinder 3, in which case, in the illustrated example, a pressure transmitting piston 16 is arranged between the second piston 12 and the third piston 13. An intermediate space 21 is bounded between the third piston 13 and the pressure transmitting piston 16, the application of a hydraulic pressure to said intermediate space 21 holding the third piston 13 against a stop 22 which is formed in the housing 20, while the pressure transmitting piston 16, and therefore the primary piston 12 of the tandem master cylinder, is acted on with the effect of increasing pressure in the tandem master cylinder 3. A movement of the pressure transmitting piston 16 which results from this loading is sensed by means of a second travel sensor 23. Furthermore, the third piston 13 bounds, in the housing 20, a hydraulic chamber 17 whose function will be explained in the text below. A first line 34, which is connected by means of a (currentless open) check valve 33, which is open in the currentless state, is connected to the hydraulic chamber 17 by means of a second line 35 which is connected to the aforementioned pressure chamber 14.

Furthermore, from FIG. 1 it is clear the abovementioned pressure chamber 14 is connected via a disconnectable connecting line 24 to a simulator chamber 25 which is bounded by a simulator piston 26. In this context, the simulator piston 26 interacts with a simulator spring 27 and an elastomer spring 28 which is connected parallel to the simulator spring 27. In this context, the simulator chamber 25, the simulator piston 26, the simulator spring 27 and the elastomer spring 28 form a pedal travel simulator which, when the braking system is actuated, gives the driver of the vehicle the accustomed pedal sensation which corresponds to a customary brake pedal characteristic. This means that when the brake pedal travel is short, the resistance rises slowly, and when the brake pedal travel is long, it increases super-proportionally. In order to damp the movement of the simulator piston 26, it is possible, for example, to provide pneumatic damping means (not illustrated). The hydraulic connecting line 24 between the simulator chamber 25 and the pressure chamber 14 or the chamber 38 of the second pressure medium reservoir vessel is disconnected by a movement of the third piston 13 in the actuating direction of the master brake cylinder 3, as a result of which the pedal travel simulator is effectively switched off. The first piston 11, the spring 15, the hydraulic chamber 14, the hydraulic connection 24, the simulator chamber 25, the simulator piston 26, the simulator springs 18 and 27 and the damping means (not illustrated) together form the simulation device which is assigned, together with a chamber 38, at atmospheric pressure, of the second pressure medium reservoir vessel, to a first brake booster pressure medium circuit which is completely separated from the wheel brake circuits I, II.

The electrohydraulic pressure generating device 2 mentioned above is composed essentially of a hydraulic cylinder/piston arrangement 29 and an electromechanical actuator 30 which is formed, for example, by an electric motor with a step-down gear mechanism which ensures a translatory movement of a hydraulic piston 31, with the result that a hydraulic pressure is built up in a pressure space 36 of the hydraulic cylinder/piston arrangement 29. The electromechanical actuator 30 is supplied with energy by an electric energy store which is provided with the reference symbol 49. The movement of the piston 31 is sensed by means of a travel sensor which is provided with the reference symbol 32. The pressure space 36 is, on the one hand, connected to the intermediate space 21 and can, on the other hand, be connected by means of a (currentless open) 2/2 way valve 37, which is open in the currentless state, to a chamber 39, at atmospheric pressure, of a second pressure medium reservoir vessel. In this context, the pressure generating device 2, the intermediate space 21 and the chamber 39 of the second pressure medium reservoir vessel are assigned to a second brake booster pressure medium circuit which is completely separated both from the first brake booster pressure medium circuit and from the wheel brake circuits I, II. A pressure sensor 40 serves to sense the pressure which is made available by the pressure generating device 2 and prevails in the intermediate space 21.

The abovementioned check valve 33 permits the chamber 17 to be disconnected from the pressure chamber 14, which prevents a movement of the third piston 13 in the actuating direction. The chamber 17, the first pressure medium line 34, the check valve 33, the second pressure medium line 35, the pressure chamber 14, the connecting line 24, the simulator chamber 25 and the second pressure medium reservoir vessel 38 form a second brake booster pressure medium circuit which is completely separated from the first brake booster pressure medium circuit and from the two wheel brake circuits I, II. Said elements are assigned their own electronic open-loop control unit 42 which interacts with the abovementioned electronic open-loop and closed-loop control unit 41 and which serves to sense sensor data, to process this data, to exchange data with other control units, to drive the electromechanical actuator 30 and the brake lights of the vehicle.

Figure 2:
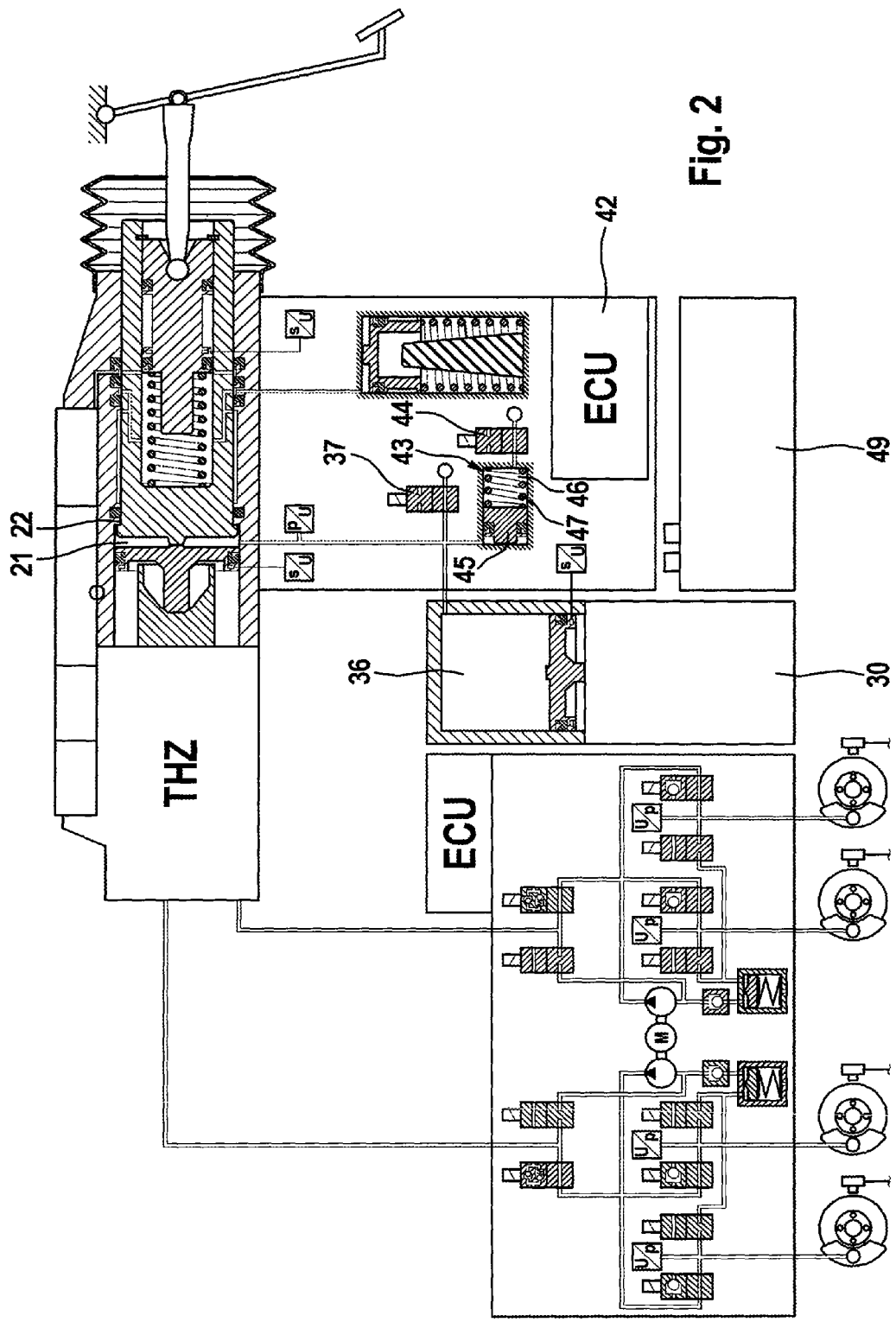
FIG. 2 shows the design of a second embodiment of the braking system according to aspects of the invention.

The design of the second embodiment of the braking system according to aspects of the invention which is shown in FIG. 2 corresponds largely to that of the first embodiment which has been explained in detail in conjunction with FIG. 1. The hydraulic pressure space 36 and/or the intermediate space 21 are/is connected to a hydraulic volume holding element 43 whose piston 45 bounds a space 46 which accommodates a pressure spring 47. The space 46 is connected to the third pressure medium reservoir vessel 39 with the intermediate connection of a (currentless open) 2/2 way valve 44 which is open in the currentless state.

In the text which follows, the method of functioning of the braking system according to aspects of the invention will be explained in more detail in conjunction with FIG. 1.

A first operating mode corresponds to a purely electric operating mode, referred to as brake-by-wire, in which all the components of the braking system are intact and are operating satisfactorily. In this mode, in order to build up a hydraulic pressure in the intermediate space 21, the 2/2 way valve 37 and the electromechanical actuator 30 are driven, with the result that the pressure which has been made available by the pressure generating device 2 or generated in its cylinder/piston arrangement 29 is fed to the intermediate space 21. As a result of the pressure effect, the third piston 13 is held against the stop 22, and the pressure transmitting piston 16 is shifted to the left, as a result of which the master brake cylinder 3 is actuated. In order to maintain the pressure, the piston 31 of the piston/cylinder arrangement 29 is held tight in the position to which it has been set. The 2/2 way valve 37 which is open in the currentless state and which is inserted into the connection between the intermediate space 21 and the second pressure medium reservoir vessel 38 is held tight in its closed switched position both during the build up of pressure and during the maintenance of pressure.

In order to reduce the pressure, the piston 31 of the cylinder/piston arrangement 29 is moved back. In the process, pressure medium flows out of the intermediate space 21 and back into the pressure space 36. In order to completely reduce the pressure to the level of atmospheric pressure, the abovementioned 2/2 way valve 37 is finally opened, as a result of which a hydraulic connection is formed to the second chamber 39 of the second pressure medium reservoir vessel. In order to avoid a partial vacuum in the intermediate space 21 or in the pressure space 36, the 2/2 way valve 37 can be configured in such a way that in the energized state it permits a volume flow of pressure medium from the third pressure medium reservoir vessel 39 into the pressure spaces 21, 26.

The process of driving the electromechanical actuator 30 is carried out by the electronic open-loop control unit 42 in such a way that the pressure in the intermediate space 21 approaches a setpoint pressure value. This setpoint pressure value results, on the one hand, from a sensed actuating component of the brake pedal 9 and, on the other hand, from an extraneous actuation component. The actuation component of the brake pedal 9 is determined from the actuation travel of the brake pedal 9 and of the first piston 11 and from the hydraulic pressure in the pressure chamber 14, which pressure is sensed by means of a pressure sensor 48 and is proportional to the actuating force of the brake pedal 9.

In a second operating mode, which is characterized by disruption of the electronics or by the absence of a pressure generated by the hydraulic pressure generating device 2 and which corresponds to a fallback level, an electronically controlled build up of pressure in the intermediate space 21 is not possible. In this operating mode, the braking system can be actuated purely mechanically. The third piston 13 moves away from its stop 22 under the influence of actuation of the brake pedal, and it pushes the second piston 12 through mechanical contact. The actuation of the master brake cylinder 3 is carried out exclusively by the muscle force of the driver of the vehicle.

In a third operating mode, which corresponds to regenerative braking, the pressure which is applied to the intermediate space 21 must be capable of being reduced to zero despite actuation of the brake pedal 9, in order to achieve the most complete possible regeneration of the kinetic energy of the vehicle. For this purpose, the check valve 33 is closed, with the result that the chamber 17 is disconnected. The disconnection of the chamber 17 prevents movement of the third piston 13 in the actuating direction. A need for deceleration which cannot be covered completely by regeneration is covered by partial braking corresponding to the difference. As an alternative to using the check valve 33, it is possible, in the third operating mode, i.e. during regenerative braking using the pressure generating device 2, to apply a pressure in the intermediate space 21 which is selected to be both higher than the highest of the currently required wheel brake pressures and higher than the pressure required to hold back the piston 13. The axle-specific or wheel-specific brake pressures are generated from this pressure using the ABS or ESP wheel brake pressure modulation unit connected downstream.

The present invention makes possible a braking system which is of simple design and in which the brake pedal characteristic in a brake-by-wire operating mode and during regenerative braking operations is not dependent on the actuating state of the rest of the braking system, as a result of which the pedal sensation when a driver brakes cannot be disrupted either by the simultaneous occurrence of extraneous braking or by other control activities of the braking system such as anti-lock braking, traction control or driving stability control.

The braking system according to aspects of the invention also has the advantage that there is no need for complex hydraulic components such as a pump, hydraulic accumulator or slide valve. Compared to the components just mentioned, simple and cost-effective elastomer-sealed pistons and cylinders and the 2/2 solenoid valves which have been proven a million times in braking technology are the only hydraulic components used. The invention permits use of a mechatronic actuator which can be fed both from an electric actuating energy store and directly from an on-board vehicle electric system.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A braking system for motor vehicles comprising:
a master cylinder to which wheel brake circuits are connected,
a first piston which is coupled to a brake pedal via a pressure rod which transmits actuating forces,
a second piston configured to actuate the master cylinder,
a third piston which is configured to be actuated by the first piston and which is configured to be connected in a force transmitting fashion to the second piston,
a simulation device with at least one elastic element which, in a brake-by-wire operating mode, generates a pedal sensation that can be felt by a driver of the vehicle,
an intermediate space, to which hydraulic pressure is applied, between the second piston and third piston, wherein an application of pressure to the intermediate space loads the second and third pistons in opposite directions,
a pressure generating device which controls the pressure in the intermediate space,
a pressure medium reservoir vessel under atmospheric pressure and configured to be connected hydraulically to the intermediate space,
means for electrically controlling the pressure in the intermediate space, wherein the pressure medium which is required to electrically control the pressure applied to the intermediate space is kept available under atmospheric pressure, and selectively placed under a higher pressure, in the pressure generating device,
wherein a hydraulic pressure chamber is formed in the third piston, and
a hydraulic simulator chamber connected to the hydraulic pressure chamber via a disconnectable hydraulic connecting line, the hydraulic simulator chamber bounded by a hydraulic simulator piston which is connected in a force transmitting fashion to the at least one elastic element of the simulation device.

2. The braking system as claimed in claim 1, wherein the pressure generating device is formed by a cylinder/piston arrangement whose piston can be actuated by an electromechanical actuator.

3. The braking system as claimed in claim 1, wherein an electric energy store is provided which supplies the electromechanical actuator with energy as long as said actuator is not fed directly from an on-board vehicle electric system.

4. The braking system as claimed in claim 3, wherein the electric energy store is recharged from the on-board vehicle electric system and a charge state and a functional capability of the electric energy store are monitored by an electronic unit which is assigned to the braking system.

5. The braking system as claimed in claim 1, wherein the connection between the hydraulic pressure chamber and the hydraulic simulator chamber is configured to be disconnected by a movement of the third piston.

6. The braking system as claimed in claim 1, wherein the pressure generating device is connected to the pressure medium reservoir vessel with the intermediate connection of an electrically switchable 2/2 way valve.

7. The braking system as claimed in claim 1, wherein a hydraulic volume holding element is connected to the pressure generating device.

8. The braking system as claimed in claim 7, wherein a volume holding function of the hydraulic volume holding element is configured to be connected and disconnected using a solenoid valve.

9. The braking system as claimed in claim 1, wherein the pressure chamber, the simulator chamber, and a first chamber of a pressure medium reservoir vessel are assigned to a first brake booster pressure medium circuit, and the pressure generating device, the intermediate space and a second chamber of a pressure medium reservoir vessel are assigned to a second brake booster pressure medium circuit,
wherein while the braking system is operating, no exchange of pressure medium takes place between the first and second brake booster pressure medium circuits or the wheel brake circuits.

10. The braking system as claimed in claim 1, wherein depressing the brake pedal is sensed, processed electronically and converted into activation of the pressure generating device.

11. The braking system as claimed in claim 10, wherein depressing the brake pedal is sensed by a measurement variable which represents the pedal travel, the pedal force, or both the pedal travel and the pedal force.

12. The braking system as claimed in claim 11, wherein the variable which represents the pedal travel is the travel of the first piston and is sensed by a piston travel sensor.

13. The braking system as claimed in claim 11, wherein the variable which represents the pedal travel is the rotational angle of the brake pedal and is sensed by a rotational angle sensor.

14. The braking system as claimed in claim 11, wherein the variable which represents the pedal force is the force in the pressure rod which is sensed by a force sensor which is inserted into the pressure rod.

15. The braking system as claimed in claim 11, wherein the variable which represents the pedal force is the pressure in the pressure chamber which is sensed by a pressure sensor.

16. The braking system as claimed in claim 1, further comprising means for sensing travel executed by the second piston.

17. The braking system as claimed in claim 1, wherein a pressure transmitting piston is provided between the second piston and the third piston.

18. The braking system as claimed in claim 17, further comprising means for sensing travel executed by the pressure transmitting piston.

* * * * *